United States Patent
Maeda et al.

(10) Patent No.: US 7,500,848 B2
(45) Date of Patent: Mar. 10, 2009

(54) MOLD USED FOR MANUFACTURING ELECTRIC MOTOR ROTOR

(75) Inventors: Takuya Maeda, Yamanashi (JP); Takashi Okamoto, Yamanashi (JP); Makoto Funakubo, Yamanashi (JP); Takeshi Tamaki, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 11/564,652

(22) Filed: Nov. 29, 2006

(65) Prior Publication Data
US 2007/0128307 A1    Jun. 7, 2007

(30) Foreign Application Priority Data
Dec. 2, 2005    (JP) .............................. 2005-349945

(51) Int. Cl.
*H02K 15/03* (2006.01)
(52) U.S. Cl. .................................. 425/542; 310/156.53
(58) Field of Classification Search ................. 425/542; 310/154, 156.53
See application file for complete search history.

(56) References Cited

FOREIGN PATENT DOCUMENTS

| | | | |
|---|---|---|---|
| EP | 1176700 | A2 | 1/2002 |
| JP | 01231642 | A | 9/1989 |
| JP | 03040740 | A | 2/1991 |
| JP | 5-83892 | A | 4/1993 |
| JP | 2000166190 | A | 6/2000 |
| JP | 2000354342 | A | 12/2000 |
| JP | 2002247784 | A | 8/2002 |

OTHER PUBLICATIONS

Decision of Final Rejection of Patent Application No. 2005-349945 mailed Dec. 18, 2007.

*Primary Examiner*—Jeff Aftergut
*Assistant Examiner*—Jaeyun Lee
(74) *Attorney, Agent, or Firm*—Lowe, Hauptman, Ham & Berner, LLP

(57) ABSTRACT

A mold used in a manufacturing process of a rotor of an electric motor, the rotor including a rotor core with a plurality of magnet-retaining apertures and a plurality of permanent magnets individually retained in the magnet-retaining apertures of the rotor core, for pouring a resinous material into gaps defined between the magnet-retaining apertures and the permanent magnets. The mold includes a cavity for accommodating the rotor core at a predetermined position, with the rotor core receiving the permanent magnets individually in the magnet-retaining apertures; and a deformation inhibiting surface provided in the cavity and coming into at least local contact with an outer circumferential surface of the rotor core, during a period when the resinous material is poured into the gaps, to inhibit the bulging deformation of the outer circumferential surface.

15 Claims, 5 Drawing Sheets

MOLD USED FOR MANUFACTURING ELECTRIC MOTOR ROTOR

BACKGROUND OF THE INVENTION

1. Field of the Invention

The present invention relates to a mold used for manufacturing a rotor of an electric motor.

2. Description of the Related Art

In a rotor of an electric motor having a permanent-magnet field system (e.g., a synchronous motor), it is known that a plurality of permanent magnets are mounted in an embedded manner at predetermined positions in a cylindrical rotor core formed by stacking or laminating magnetic sheets such as silicon steel plates. The rotor of this type is typically manufactured by preliminarily forming a plurality of magnet-retaining apertures (typically, axially-extending through holes) in a predetermined circumferentially-distributed arrangement about a rotor shaft, each aperture having a profile substantially corresponding to a profile of each permanent magnet; inserting respectively the plurality of permanent magnets into the magnet-retaining apertures; and fixing each permanent magnet by an adhesive or an impregnant.

In the above-described conventional method for manufacturing a rotor, in the case where the adhesive is used for fixing the magnets, relatively complicated manual operations, such as the application of the adhesive to the permanent magnets, the removal of the surplus adhesive leaking from the magnet-retaining apertures, and the like, may be required. Also, in the case where the impregnant is used for fixing the magnets, relatively large-scale equipment tends to be required for an immersion process for immersing the rotor core in the impregnant, a heating process for solidifying the impregnant, etc., and thus the number of manufacturing steps tends to increase. On the other hand, it is also known that, as a rotor manufacturing method capable of resolving the above inconveniences, the rotor core is previously fabricated so that predetermined gaps are formed between respective magnet-retaining apertures and respective permanent magnets, and a resinous material is locally pored into the gaps and solidified therein, so as to fix the permanent magnets to the rotor core (e.g., see Japanese Unexamined Patent Publication (Kokai) No. 5-83892 (JP-A-5-083892)).

In the rotor manufacturing method disclosed in JP-A-5-083892, grooves (i.e., gaps) extending in an axial direction are formed adjacent to and in communication with the respective magnet-retaining apertures of a rotor core, and a molten resinous material is injected into the grooves and solidified therein by an injection molding technique, so as to fix the permanent magnets in the magnet-retaining apertures. In the injection molding process, a mold including a cavity for accommodating the rotor core and an injection molding machine onto which the mold can be installed are provided, and the rotor core receiving the permanent magnets in the respective magnet-retaining apertures is supported firmly and securely in the cavity of the mold. In this state, the resinous material is injected into the grooves of the rotor core under pressure by using the injection molding machine.

In the rotor manufacturing method adopting the injection molding technique set forth in the above-described JP-A-5-083892, by only providing the mold including the cavity for accommodating the rotor core and the injection molding machine onto which the mold can be installed, it is possible to easily and quickly perform a work for fixing the permanent magnets to the respective magnet-retaining apertures of the rotor core and, therefore, advantages are obtained in which complicated manual operations when using an adhesive and large-scale equipment when using an impregnant are eliminated. However, in order to accurately inject the resinous material into the narrow grooves formed between the respective magnet-retaining apertures and the respective permanent magnets, a relatively high injection pressure is required. In this connection, in the rotor core formed by laminating magnetic sheets, when a portion of a material (hereinafter referred to as a marginal portion) defined between each magnet-retaining aperture and the outer circumferential surface of the rotor core becomes much thinner, each magnetic sheet may be deformed at the marginal portion so as to bulge outward due to a high injection pressure in the resinous material. It the rotor core is deformed in a manner as described above, during rotation of a rotor, a magnetic flux passing through the rotor core may be affected to degrade a rotational accuracy and/or the rotor core may come into contact with a stator core to be damaged and, thereby, it is concerned that an operational reliability of an electric motor is deteriorated

SUMMARY OF THE INVENTION

It is an object of the present invention to provide a mold used in a manufacturing process of a rotor of an electric motor having a permanent-magnet field system, for poring a resinous material into gaps between respective magnet-retaining apertures formed in a rotor core and respective permanent magnets, wherein the deformation of the rotor core can be surely inhibited and the resinous material can be accurately and sufficiently poured into the gaps in the rotor core and, thereby, an electric motor rotor having excellent operational reliability can be manufactured.

To accomplish the above object, the present invention provides a mold used in a manufacturing process of a rotor of an electric motor, the rotor including a rotor core with a plurality of magnet-retaining apertures and a plurality of permanent magnets individually received and retained in the plurality of magnet-retaining apertures of the rotor core, for pouring a resinous material into gaps defined between the respective magnet-retaining apertures and the respective permanent magnets, the mold comprising a cavity for accommodating the rotor core at a predetermined position, with the rotor core receiving the plurality of permanent magnets individually in the plurality of magnet-retaining apertures; and a deformation inhibiting surface provided in the cavity and coming into at least local contact with an outer circumferential surface of the rotor core, during a period when the resinous material is poured into the gaps, to inhibit a bulging deformation of the outer circumferential surface.

In the mold having the above configuration, the deformation inhibiting surface may be provided in proximity to a gate for a molten resinous material, the gate opening to the cavity, and may be disposed to oppose to, and to be capable of coming into contact with, a local area of the outer circumferential surface of the rotor core, the local area corresponding to a gap region defined in a predetermined length from a resin pouring end of each gap when the resin pouring end is connected to the gate.

Also, in a state where the outer circumferential surface of the rotor core is not deformed, a clearance of 0.2 mm or less may be defined between the outer circumferential surface of the rotor core accommodated in the cavity and the deformation inhibiting surface provided in the cavity.

BRIEF DESCRIPTION OF THE DRAWINGS

The above and other objects, features and advantages of the present invention will become more apparent from the following description of preferred embodiments in connection with the accompanying drawings, wherein.

DETAILED DESCRIPTION

Figure 1:
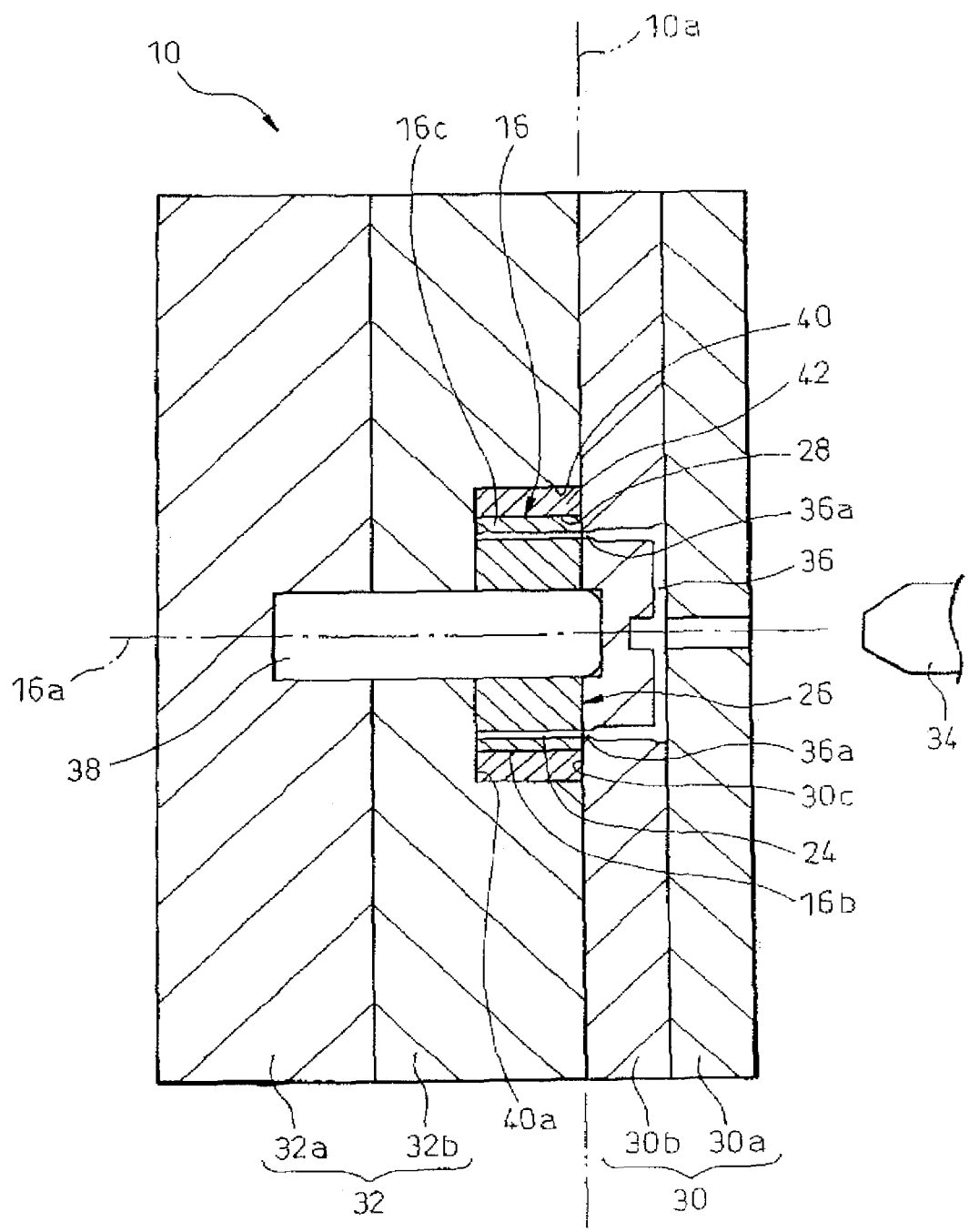
FIG. 1 is a sectional view showing a mold according to an embodiment of the present invention with a rotor core being accommodated in a cavity.

The embodiments of the present invention are described below, in detail, with reference to the accompanying drawings. In the drawings, the same or similar components are denoted by common reference numerals.

Figure 3:
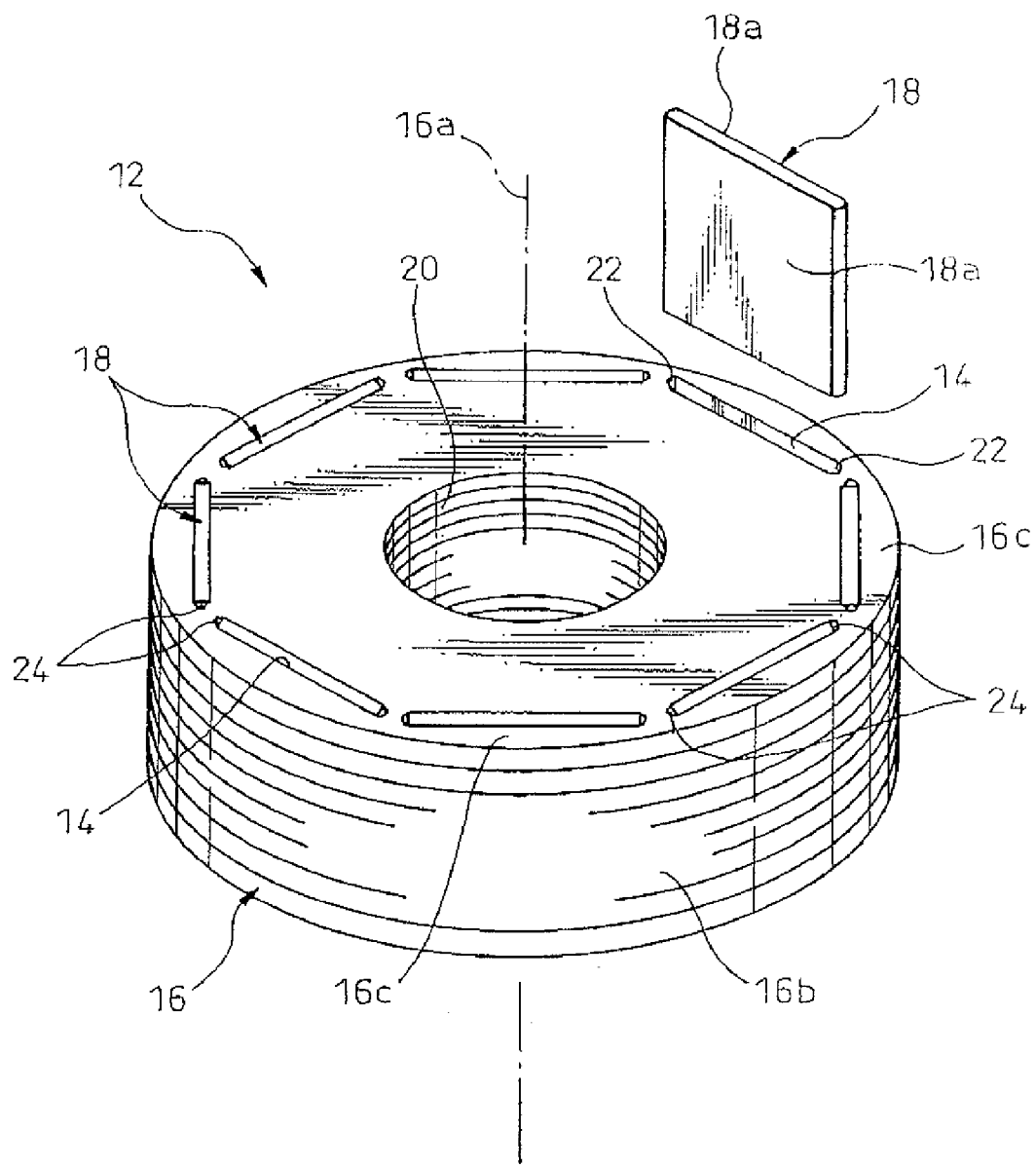
FIG. 3 is a perspective view showing a rotor of an electric motor, which can be manufactured by using the mold of FIG. 1.
Figure 4A:
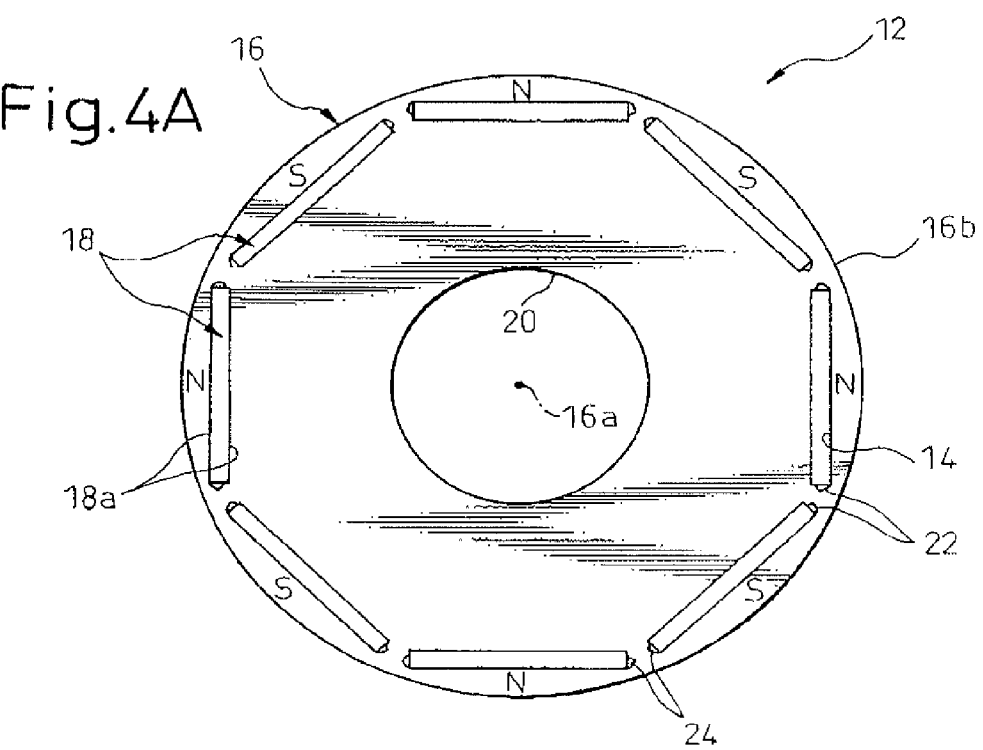
FIG. 4A is a plan view of the rotor of FIG. 3.
Figure 4B:
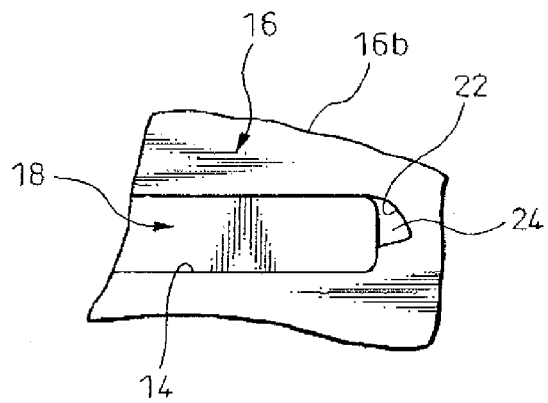
FIG. 4B is an enlarged view of a major part of the rotor of FIG. 3.

Referring to the drawings, FIGS. 1. and 2 are illustrations respectively showing a mold 10 according to an embodiment of the present invention, and FIGS. 3, 4A and 4B are illustrations respectively showing a rotor 12 of an electric motor, which can be manufactured by using the mold 10. The rotor 12 includes a rotor core 16 having a plurality of (eight, in the drawing) magnet-retaining apertures 14 and a plurality of (eight, in the drawing) permanent magnets 18 individually received and retained in the plurality of magnet retaining apertures 14 of the rotor core 16.

The rotor core 16 is a substantially cylindrical member formed by stacking or laminating magnetic sheets, such as silicon steel plates, and is provided at a center thereof with a shaft hole 20 penetrating therethrough along an axis 16a (FIG. 3). The plurality of magnet-retaining apertures 14 are formed respectively as axially-extending through holes, and are disposed in proximity to an outer circumferential surface 16b of the rotor core 16 and in a predetermined, circumferentially regular-interval arrangement about the axis 16a. Each of the magnet-retaining apertures 14 has a slot-like profile substantially corresponding to a tabular profile of the permanent magnet 18 as to be retained. Relatively thin marginal portions 16c are formed in the respective magnetic sheets between the magnet-retaining apertures 14 and the outer circumferential surface 16b of the rotor core 16.

The rotor core 16 is attached to a shaft (not shown) at a shaft hole 20 by, for example, a shrinkage fit, with the permanent magnets 18 being securely retained in the respective magnet-retaining apertures 14. The rotor 12 having the shaft is rotatably supported on a housing (not shown) in a state where the outer circumferential surface 16b of the rotor core 16 opposes a stator (not shown) with a predetermined air-gap defined therebetween, whereby an electric motor is constituted.

Each of the permanent magnets 18 has a flat shape which is substantially rectangular as seen in a plan view, and is magnetized or polarized in a thickness direction so as to form N and S poles respectively in a pair of major surfaces 18a thereof (FIG. 3). The permanent magnets 18 are individually inserted into the corresponding magnet-retaining apertures 14 in an alternate arrangement where the mutually-different magnetic poles of the permanent magnets 18 disposed side-by-side in a circumferential direction are oriented toward the outer circumferential surface 16b of the rotor core 16. In this state, magnetic poles corresponding to those of the nearest permanent magnets is are formed on the outer circumferential surface 16b of the rotor core 16 in a circumferentially alternate arrangement (FIG. 4A).

Each of the magnet-retaining apertures 14 is provided with a pair of grooves 22 continuously extending in the axial direction and formed at longitudinally opposite ends of each aperture 14 as seen in the plan view of FIG. 4A. The grooves 22 of each magnet-retaining aperture 14 are disposed to oppose to a pair of lateral edges of the permanent magnet 18 received in the aperture 14, so as to form gaps 24 having predetermined shapes between the magnet-retaining aperture 14 and the permanent magnet 18 (FIG. 4B). The mold 10 is used to fill the respective gaps 24 with a molten resinous material by, for example, an injection molding machine (not shown).

The mold 10 includes a cavity 26 for accommodating the rotor core 16 at a predetermined position, with the rotor core 16 receiving the plurality of permanent magnets 18 individually in the plurality of magnet-retaining apertures 14 (FIG. 4A); and a deformation inhibiting surface 28 provided in the cavity 26 and coming into at least local contact with the outer circumferential surface 16b of the rotor core 16, during a period when the molten resinous material is poured into the plurality of gaps 24, to inhibit a bulging deformation of the outer circumferential surface 16b (FIG. 1). In the illustrated embodiment, the mold 10 is constructed from a mutually-combined pair of mold members 30, 32 separable from each other at a parting line 10a, and is mounted on a mold clamping mechanism of the injection molding machine (not shown) with one mold member 30 being carried on a stationary platen (not shown) and the other mold member 32 being carried on a movable platen (not shown). The mold member 30 at a stationary side is provided with a material passage (including a sprue, a runner and a gate) 36, for distributing the flow of the molten resinous material in predetermined directions, which is supplied from an injection mechanism (a part of a nozzle 34 is shown) of the injection molding machine. On the other hand, the mold member 32 at a movable side is provided with the cavity 26 and the deformation inhibiting surface 28, described above.

The material passage 36 of the mold member 30 is configured in such a manner that the molten resinous material can be appropriately distributed and poured into each of the plurality of gaps 24 defined between the magnet-retaining apertures 14 and the permanent magnets 18 (FIGS. 4A and 4B) in the rotor core 16 disposed at a position in the cavity 26 proper for a pouring of the resinous material. In this connection, the mold member 30 has a known two-piece structure (i.e., a first element 30a and a second element 30b) for removing the resinous material solidified in the material passage 36. The second element 30b of the mold member 30 has an end face 30c constituting the parting line 10a, and a plurality of gates 36a of the material passage 36 are opened in the end face 30c. On the other hand, the mold member 32 has a known two-piece structure (i.e., a first element 32a and a second element 32b) for incorporating thereto an ejector mechanism (not shown) and the like.

The mold member 32 is provided with a centering support element 38 extending into the cavity 26 (and fixed to the first element 32a, in the drawing). The centering support element 38 is shaped and dimensioned to be fittable into the shaft hole 20 (FIG. 3) of the rotor core 16 with no wobbling, and locates the rotor core 16, accommodated in the cavity 26, at the proper position for the pouring of the resinous material with reference to the axis 16a. In a state where the rotor core 16 is attached to the centering support element 38, the deformation inhibiting surface 28 provided in the cavity 26 is disposed to oppose to, and to be capable of coming into contact with, the substantially entire outer circumferential surface 16b of the rotor core 16.

Figure 2:
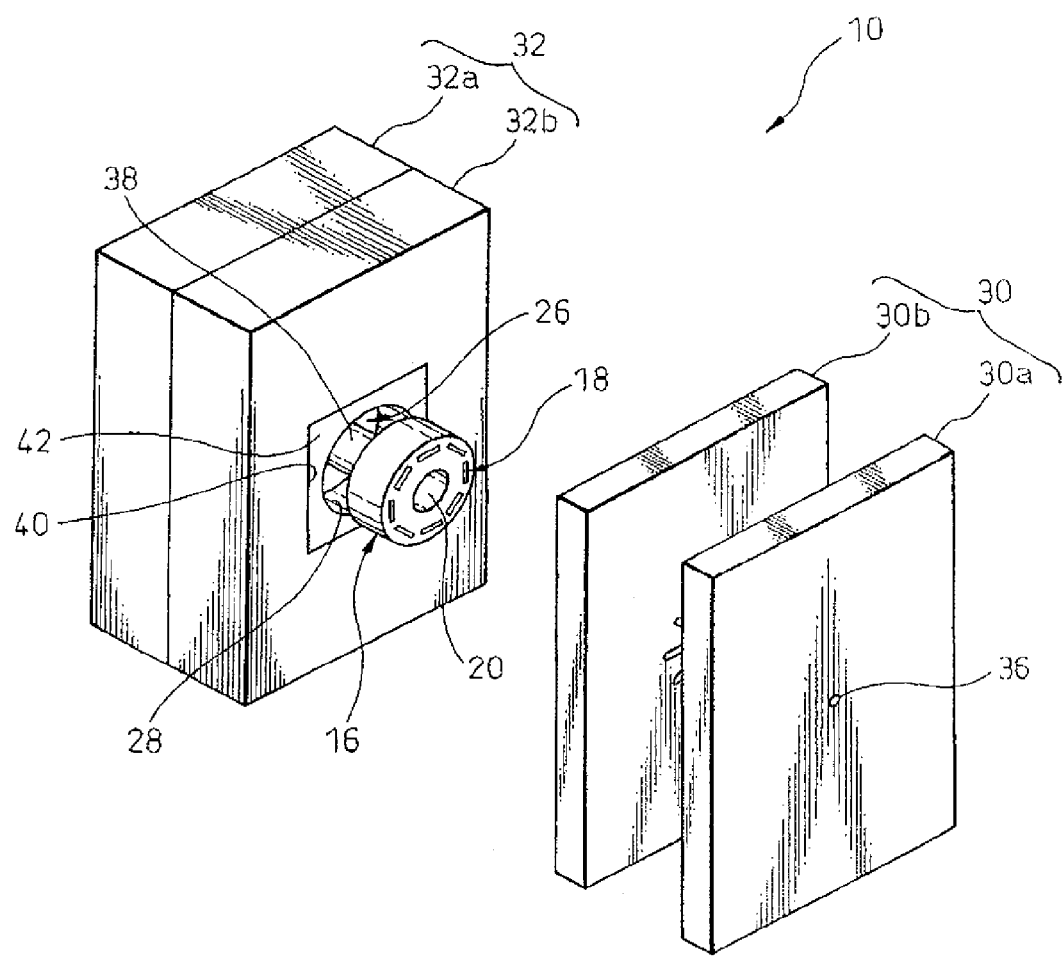
FIG. 2 is a perspective view showing the mold of FIG. 1 in an opened state.

In the illustrated embodiment, the second element 32b of the mold member 32 is provided with a recess 40 having a substantially rectangular shape as seen in a plan view, with the centering support element 38 protruding into the center thereof, and an annular insert mold 42 is securely provided in the recess 40 (FIG. 2). The recess 40 in the second element 32b of the mold member 32 and the insert mold 42 cooperate with each other to define the cavity 26, and an annular inner circumferential surface of the insert mold 12 acts as the deformation inhibiting surface 28. In this connection, in place of the illustrated configuration, the cavity 26 and the deformation inhibiting surface 28 may be formed directly in the second element 32b of the mold member 32.

A bottom surface (i.e., an axial end face) 40a of the recess 40 of the mold member 32 cooperates with the end face 30c of the second element 30b of the mold member 30 to firmly and securely hold the rotor core 16 accommodated in the cavity 26. In this situation, the bottom surface 40a of the recess 40 of the mold member 32 is tightly abutted against one axial end face of the rotor core 16 and thereby acts as a forming surface 40a hermetically closing openings at the axial ends of the gaps 24 (FIGS. 4A, 48) formed between the respective magnet-retaining apertures 14 and the respective permanent magnets 18.

In the mold 10 configured as described above, the deformation inhibiting surface 28 provided in the cavity 26 comes, at least locally, into contact with the outer circumferential surface 16b of the rotor core 16, during the period when the molten resinous material is poured into the gaps 24 between the respective magnet-retaining apertures 14 formed in the rotor core 16 and the respective permanent magnets 18, to prevent the outer circumferential surface 16b from being bulgingly deformed. Therefore, it is possible to accurately pour the molten resinous material into the plurality of gaps 24 of the rotor core 16 at a required high injection pressure, while surely inhibiting the deformation of the rotor core 16, in particular, the deformation of the outer circumferential surface 16b thereof. The molten resinous material poured into the gaps 24 under the required injection pressure entirely fills up the gaps 24, so as to firmly and mechanically couple the rotor core 16 with the permanent magnets 18. As a result, it is possible, by using the mold 10, to ensure a sufficient fixing strength of the permanent magnets 18 with high reproducibility, and thus to manufacture the rotor 12 of an electric motor with a high yield, the rotor 12 including the rotor core 16 with no deformation and having excellent operational reliability. In this connection, the resinous material molded in the gaps 24 is preferably selected from engineering plastics that have excellent fluidity and mechanical strength.

In the above configuration, it is desirable that, in a state where the outer circumferential surface 16b of the rotor core 16 is not deformed (e.g., in an initial state before the resin is poured), a minute clearance of 0.2 mm or less (a radial dimension) is defined between the outer circumferential surface 16b of the rotor core 16 accommodated in the cavity 26 and the deformation inhibiting surface 28 provided in the cavity 26. The minute clearance facilitates the insertion of the rotor core 16 into the cavity 26, and allows the rotor core 16 to be smoothly detached from the cavity 26 after the resinous material is molded in the gaps 24.

In this arrangement, during the period when the molten resinous material is poured into the gaps 24, it is speculated that the injection pressure may cause a deformation in the marginal portions 16c of the rotor core 16 by an amount corresponding to the minute clearance. However, if the clearance is 0.2 mm or less, the deformation in the marginal portions 16c does not substantially affect a magnetic flux passing through the rotor core 16, and a possible contact of the rotor core 16 with the stator core is eliminated, during the rotation of the rotor 12. Further, even if the injection pressure deforms the marginal portions 16c of the rotor core 16 by the amount of the minute clearance and thereby the outer circumferential surface 16b comes into contact with the deformation inhibiting surface 28, such a deformation is typically caused only in a local area of the outer circumferential surface 16b corresponding to a gap region defined in a predetermined length from a resin pouring end of each gap 24 when the resin pouring end is connected with each gate 36a of the mold member 30 (i.e., in an area adjacent to the axial end face of the rotor core 16, abutting against the end face 30c of the mold member 30) and, therefore, the deformation does not interfere with the smooth detachment of the rotor core 16 after the resinous material is molded.

In the mold 10 configured as described above, it may be difficult, for example, if the rotor core 16 is inserted into the cavity 26 by an automatic machine such as a robot (not shown), that a sufficient space for a holding element (e.g., a hand) for holding the rotor core 16 is obtained between the rotor core 16 and the cavity 26, Therefore, in the case where the automatic machine is used, it is advisable that the centering support element 38 of the mold member 32 is inserted halfway into the shaft hole 20 of the rotor core 16 by the automatic machine, and thereafter the rotor core 16 is pushed into the cavity 26 completely by the mold closing operation of the mold clamping mechanism of an injection molding machine, as shown in, e.g., FIG. 2.

Figure 5:
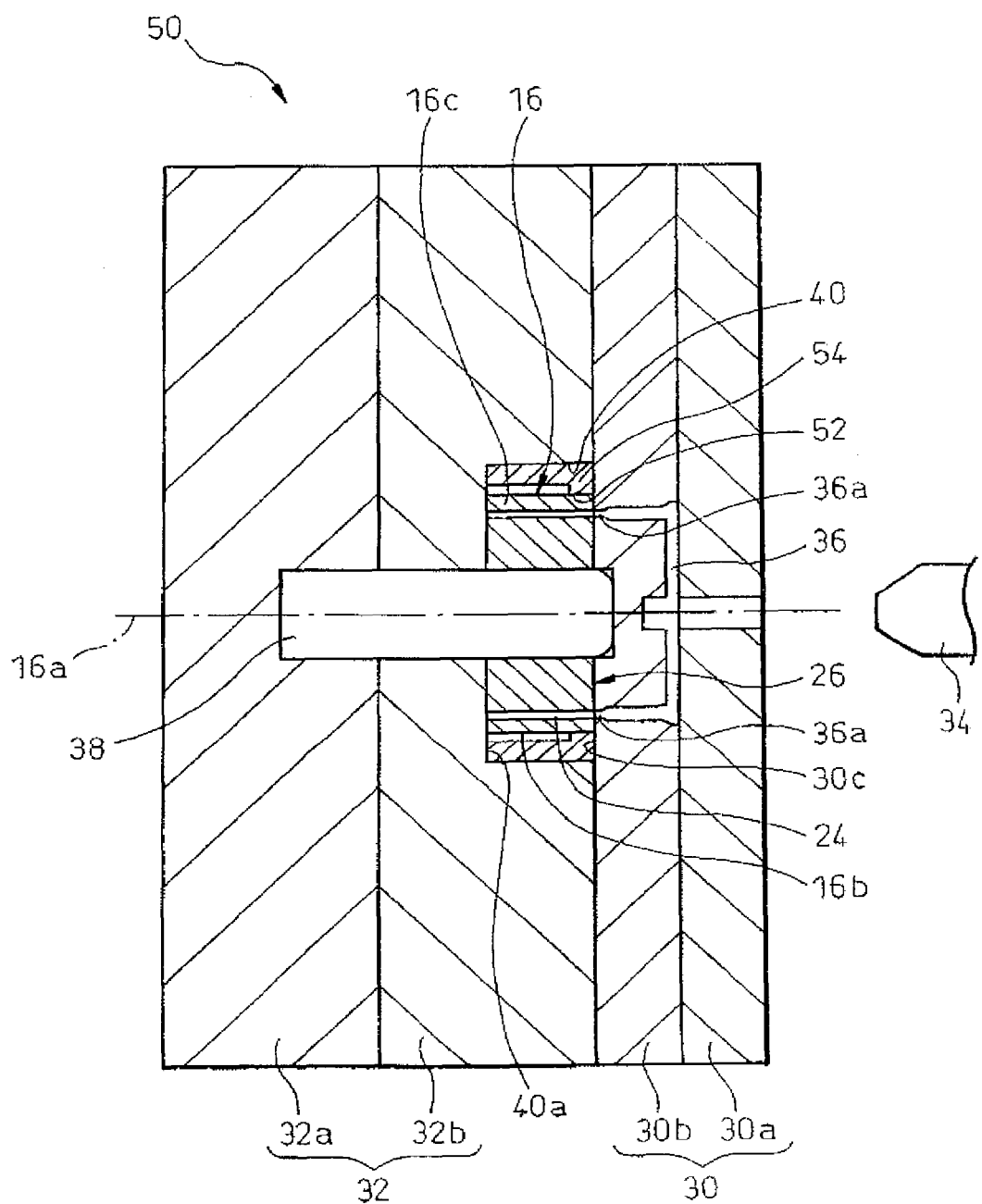
FIG. 5 is a sectional view showing a mold according to another embodiment of the present invention with a rotor core being accommodated in a cavity.

FIG. 5 shows a mold 50, according to another embodiment of the present invention, in a state where a F rotor core 16 is accommodated in a cavity 26. The mold 50 has a configuration substantially identical to that of the mold 10 described above, except for the configuration of a deformation inhibiting surface provided in the cavity 26. Therefore, corresponding components are designated by common reference numerals, and the descriptions thereof are not repeated.

The mold 50 includes the cavity 26 for accommodating the rotor core 16 (FIG. 4A) at a predetermined position; and a deformation inhibiting surface 52 provided in the cavity 26 and coming into local contact with the outer circumferential surface 16b of the rotor core 16, during a period when a molten resinous material is poured into a plurality of gaps 24 formed in the rotor core 16, to inhibit a bulging deformation of the outer circumferential surface 16b. The deformation inhibiting surface 52 is provided in proximity to gates 36a for the molten resinous material, the gates 36a opening to the cavity 26, and is disposed to oppose to, and to be capable of coming into contact with, a local area of the outer circumferential surface 16b of the rotor core 16, the local area corresponding to a gap region defined in a predetermined length from a resin pouring end of each gap 24 when the resin pouring end is connected to each gate 36a (i.e., an area adjacent to the axial end face of the rotor core 16, abutting against the end face 30c of the mold member 30).

In the illustrated embodiment, an annular insert mold 54 is securely provided in a recess 40 formed in a second element 32b of a mold member 32. The recess 40 of the mold member 32 and the insert mold 54 cooperate with each other to define the cavity 26, and one axial end area (a right end area, in the drawing) of an annular inner circumferential surface of the insert mold 54 acts as the deformation inhibiting surface 52. The remaining area of the annular inner circumferential surface of the insert mold 54 is disposed to oppose to, and to be unable to come into contact with, the outer circumferential surface 16b of the rotor core 16 accommodated in the cavity 26, with a clearance larger than 0.2 mm defined therebetween. In this connection, in place of the illustrated configuration, the cavity 26 and the deformation inhibiting surface 52 may be formed directly in the second element 32b of the mold member 32.

In the mold 50 configured as described above, the deformation inhibiting surface 52 provided in the cavity 26 comes into contact with the local area of the outer circumferential surface 16b of the rotor core 16, the local area being adjacent to the rotor core end face facing toward the gates 36a, during the period when the molten resinous material is poured into the gaps 24 in the rotor core 16, to also prevent the outer circumferential surface 16b from being bulgingly deformed. Therefore, in a manner similar to the mold 10 described above, it is possible, by using the mold 50, to accurately and sufficiently pour the molten resinous material into the plurality of gaps 24, while surely inhibiting the deformation of the rotor core 16, and in particular, the deformation of the outer circumferential surface 16b thereof. As a result, it is possible to ensure a sufficient fixing strength of the permanent magnets 18 with high reproducibility, and thus to manufacture the rotor 12 of an electric motor with high yield, the rotor 12 including the rotor core 16 with no deformation and having excellent operational reliability.

In particular, in the mold 50, it is possible to inhibit the bulging deformation of an area, as to be probably deformed, in the outer circumferential surface 16b of the rotor core 16. Moreover, there is an advantage that the deformation inhibiting surface 52 provided in the cavity 26 is disposed adjacent to only the local area of the outer circumferential surface 16b of the rotor core 16 and, thereby, the insertion of the rotor core 16 into the cavity 26 is significantly facilitated.

While the invention has been described with reference to specific preferred embodiments, it will be understood, by those skilled in the art, that various changes and modifications may be made thereto without departing from the scope of the following claims.

The invention claimed is:

1. A mold for use in a manufacturing process of a rotor of an electric motor, the rotor including a rotor core with a plurality of magnet-retaining apertures and a plurality of permanent magnets individually received and retained in the magnet-retaining apertures of the rotor core, respectively, wherein the mold is for pouring a resinous material into gaps defined between the respective magnet-retaining apertures and the respective permanent magnets, the mold comprising:
    a cavity for accommodating the rotor core at a predetermined position, with the rotor core receiving the permanent magnets individually in the magnet-retaining apertures, respectively; and
    a deformation inhibiting surface provided in said cavity for coming into at least local contact with an outer circumferential surface of the rotor core, during a period when the resinous material is poured into the gaps, to inhibit a bulging deformation of the outer circumferential surface of the rotor core;
    wherein said deformation inhibiting surface is securely provided as an annular inner circumferential surface of said cavity.

2. A mold as set forth in claim 1, wherein said deformation inhibiting surface is provided in proximity to a gate for the resinous material in a molten state, said gate opening to said cavity, and is disposed to oppose to, and to be capable of coming into contact with, a local area of the outer circumferential surface of the rotor core, the local area corresponding to a gap region defined in a predetermined length from a resin pouring end of each gap when the resin pouring end is connected to said gate.

3. A mold as set forth in claim 1, wherein, in a state where the outer circumferential surface of the rotor core is not deformed, a clearance of 0.2 mm or less is defined between the outer circumferential surface of the rotor core accommodated in said cavity and said deformation inhibiting surface provided in said cavity.

4. A mold as set forth in claim 1, wherein said deformation inhibiting surface is adapted to come into contact with the outer circumferential surface of the rotor core over substantially an entire circumference of the rotor core.

5. A mold as set forth in claim 1, wherein an inner wall of said cavity has a step-wise configuration with first and second portions arranged successively in an axial direction of said cavity, wherein
    the first portion of said inner wall defines said deformation inhibiting surface and is adjacent a gate of said mold through which the resinous material in a molten state is poured, in use, into said cavity,
    the second portion of said inner wall is located farther away from said gate than the first portion, and is adapted to face but be radially spaced, in use, from the outer circumferential surface of the rotor core.

6. A mold as set forth in claim 5, wherein the first portion of the inner wall of said cavity projects radially inwardly from the second portion of said inner wall.

7. A mold as set forth in claim 6, wherein, in a state where the outer circumferential surface of the rotor core is received in the cavity and is not deformed,
    a radial clearance of 0.2 mm or less is defined between the outer circumferential surface of the rotor core accommodated in said cavity and said first portion, and
    a radial clearance of 0.2 mm or larger is defined between the outer circumferential surface of the rotor core accommodated in said cavity and said second portion.

8. A mold as set forth in claim 6, wherein a length of the first portion along the axial direction of said cavity is shorter than that of the second portion.

9. A mold as set forth in claim 1, further comprising:
    a first mold member having a gate through which the resinous material in a molten state is poured, in use, into said cavity; and
    a second mold member defining said cavity and couplable to the first mold member for receiving the molten resinous material through the gate;
    wherein said second mold member has a rectangular recess in a central region thereof and a matching rectangular mold insert securely received in said recess, said mold insert having a hollow, cylindrical interior that defines the cavity.

10. A mold as set forth in claim 9, wherein said recess and mold insert are square.

11. A mold as set forth in claim 9, wherein said deformation inhibiting surface is adapted to come into contact with the outer circumferential surface of the rotor core over substantially an entire circumference of the rotor core.

12. A mold as set forth in claim 9, wherein an inner wall of said cavity has a step-wise configuration with first and second portions arranged successively in an axial direction of said cavity, wherein
    the first portion of said inner wall defines said deformation inhibiting surface and is adjacent a gate of said mold through which the resinous material in a molten state is poured, in use, into said cavity, the second portion of said inner wall is located farther away from said gate than the first portion, and is adapted to face but be radially spaced, in use, from the outer circumferential surface of the rotor core.

13. A mold as set forth in claim 12, wherein the first portion of the inner wall of said cavity projects radially inwardly from the second portion of said inner wall.

14. A mold as set forth in claim 13, wherein, in a state where the outer circumferential surface of the rotor core is received in the cavity and is not deformed, a radial clearance of 0.2 mm or less is defined between the outer circumferential surface of the rotor core accommodated in said cavity and said first portion, and a radial clearance of 0.2 mm or larger is defined between the outer circumferential surface of the rotor core accommodated in said cavity and said second portion.

15. A mold as set forth in claim 13, wherein a length of the first portion along the axial direction of said cavity is shorter than that of the second portion.

* * * * *